Figure 1:
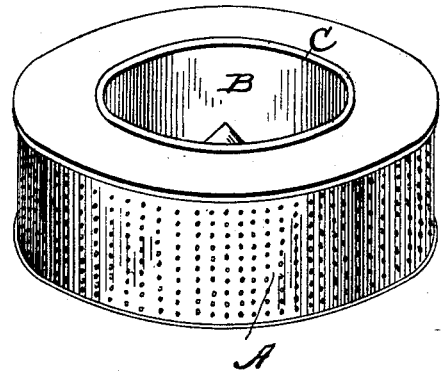

M. S. BRINGIER.
MODE OF PURIFYING WATER.

No. 81,979.

Patented Sept. 8, 1868.

Witnesses:
H. N. Jenkins
Rufus R. Rhodes

Inventor
M. S. Bringier

United States Patent Office.

M. S. BRINGIER, OF ASCENSION PARISH, LOUISIANA.

Letters Patent No. 81,979, dated September 8, 1868.

IMPROVED MODE OF PURIFYING WATER.

*The Schedule referred to in these Letters Patent and making part of the same.*

TO ALL WHOM IT MAY CONCERN:

Be it known that I, M. S. BRINGIER, of the parish of Ascension, in the State of Louisiana, have invented a certain new, useful, and improved Machine for Filtering Liquids; and I do hereby declare the following to be a full, clear, and exact description of the same, reference being had to the annexed drawing, making a part of this specification.

Before I proceed to indicate the nature of my invention, or to describe its mode of operation, a few introductory remarks as to the causes that give it value and importance will not be out of place.

It is familiar knowledge to every intelligent mind that the water we drink and use in cookery has a decided influence for good or evil upon our general health. If that water be pure, the influence is favorable, but a contrary effect is nearly always produced if it be impure. The impurity may proceed from mechanical vices altogether, or from such as are wholly chemical, or it may be produced by both these vices combined. The former are usually visible, if not in individual form, at least collectively, as when the color or density of the water is changed by their presence and incorporation in it. The latter are for the most part held in solution, and often fail even to discolor the water, or in any other manner discernibly to affect it, excepting only through the effects that are produced by its use. Very much of the water that is used in large cities and towns contains both mechanical and chemical impurities, and needs to be freed of the same before it can be used without risk of deleterious effect upon the health of the people.

Especially is this the case in the city of New Orleans, wherein the turbid water from the Mississippi river, or the fœtid infusoria-laden rain-water of the cisterns, constitutes the whole supply, and which, therefore, must be made to subserve every purpose whatsoever. To a very considerable extent the same thing obtains along the whole course of the Mississippi river, as well as in its great water-sheds, and hence the prevalence in these localities, particularly at certain seasons of the year, of a vast variety of disturbances or disorders of the stomach or bowels, and the consequent serious diseases that are incident thereto or follow therefrom.

Now, although a mere filtration, however perfect and searching it may be, does not necessarily rid water of its chemical impregnations, it is certain that all merely mechanical impurities are eliminated thereby, and that, as a general thing, the more active and potential chemical vices are sufficiently removed or reduced as to render them practically harmless. Hence it follows that water that has been well filtered is sufficiently pure for general purposes of health, and that a filtering-machine that can thus affect the water that is used by the dense masses of large cities, in a short space of time, and at a trifling cost of money, becomes of incalculable value and importance to a city like that of New Orleans.

My invention fulfils all these conditions, and goes far beyond them in its adaptations to other spheres of usefulness, in some instances of narrower scope, in others of far wider influence and effect. And it consists of an improvement upon or an addition to the ordinary centrifugals that are almost universally used in connection with the manufacture of sugar from cane-juice.

I do not alter said centrifugals in the slightest particular, excepting that I may sometimes make them smaller and sometimes larger, and my invention consists simply in inserting, within the revolving perforated drum therein, a wall of felt, or other equivalent substance, which, impinging closely upon the perforated perimeter of said drum interiorly, takes up the impurities as the water is forced through it by the centrifugal force that is brought into action by the revolution of the drum. Felt, and several other like substances, will answer every purpose where the water is to be freed of mechanical ingredients, but where there has been an infusion of deleterious chemical elements, and antiseptic effects are requisite to complete the process of purification, a carbonaceous wall may be substituted for it, or the wall may be of any other substance that will better produce the desired result.

Figure 2:
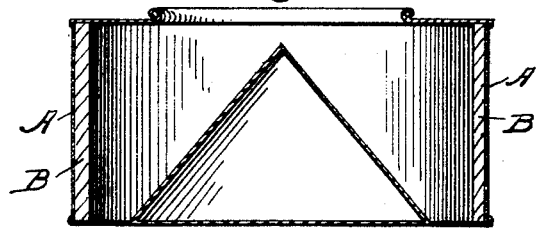

But my invention will be better understood by referring to the drawings, which, at Figure 1, represent the ordinary perforated revolving drum of a sugar-centrifugal, and at Figure 2 a sectional view of the same with my invention attached thereto.

I have not considered it requisite to show the whole of a centrifugal, because the construction of the same is well known to all persons at all acquainted with the making of sugar, and because, furthermore, my invention refers exclusively to the revolving perforated drum, which is shown; but it will be understood that, although not represented or described, I propose to use the whole apparatus, in order to prevent the escape of the filtered water, and to control its subsequent distribution.

On the drawings, A represents the perforated perimeter of the drum, and B my inner wall, of felt or other substance, and these parts exhibit the whole of my invention.

The operation is as follows, to wit: Water is poured into the drum at the opening C, in a continuous stream, whilst the drum is rotated rapidly, say at the rate of fifteen hundred or more revolutions a minute, and by the centrifugal power that is developed, it (the water) is forced through the felt or other material, whatever the same may be, and through the minute perforations in the perimeter of the drum, in a pure state, whilst the impurities remain in the felt. The water escapes in the form of spray, and is dashed against the concentric wall of the centrifugal, that is not shown on the drawings, and then falls to the bottom of the machine, whence it is carried by pipes wherever it is wanted.

Two or three machines of double the size of the ordinary sugar-house centrifugal would, if kept in action constantly, at a rapid rate of revolution, filter water enough to supply the entire need of the population of New Orleans.

Small machines could be put on board every steamboat on the Mississippi river, and on every plantation on its banks, and thus secure pure water for the thousands who are now obliged to drink or otherwise use the muddy water as it is drawn from the great river, to the great prejudice of their health.

Sea-going vessels could be provided in the same way, and so, at proper intervals, might be purified the thickening water in the tanks, to the infinite relief and comfort of every person on board the same.

But I need not specify the manifold uses to which my invention may be applied, wherever steam or horse or hand or any other power may be secured to operate it, nor yet the vast advantage it possesses over every filtering-machine heretofore devised, in its capacity for accomplishing great results, for both these points are so plainly obvious, on the slightest reflection, that it would be a work of supererogation were I to attempt the task.

Whenever the inner wall of felt or other substance needs to be cleaned from an accumulation of matters that have been taken from the water by it, it can be withdrawn and washed, and then put back again with great ease and dispatch. Or, a wall of one substance may be substituted for another, at any time, to suit varying conditions of the water to be filtered, with equal rapidity and facility.

Having thus described my invention, what I claim, and desire to secure by Letters Patent, is—

The process of filtering water, by passing it through a vessel, constructed and operating substantially as described, whereby it is subjected to the action of centrifugal force, and a more rapid filtration is effected, as set forth.

M. S. BRINGIER.

Witnesses:
H. N. JENKINS,
RUFUS R. RHODES.